UNITED STATES PATENT OFFICE.

WALTER N. HAWORTH AND JAMES COLQUHOUN IRVINE, OF ST. ANDREWS, SCOTLAND.

MANUFACTURE OF HYPOCHLOROUS ACID.

1,227,049.    Specification of Letters Patent.    Patented May 22, 1917.

No Drawing.    Application filed February 19, 1916. Serial No. 79,433.

*To all whom it may concern:*

Be it known that we, WALTER NORMAN HAWORTH and JAMES COLQUHOUN IRVINE, subjects of the King of Great Britain, residing at St. Andrews, in the county of Fife, Scotland, have invented certain new and useful Improvements in the Manufacture of Hypochlorous Acid, of which the following is a specification.

This invention relates to the manufacture of hypochlorous acid.

It is known that hypochlorous acid can be produced by the oxidation of chlorin by mercuric oxid in presence of water and in some cases hypochlorous acid can be produced by passing chlorin into water in presence of a substance capable of neutralizing the hydrochloric acid formed.

According to our process we find we can effect the reaction not by virtue of the oxidizing or neutralizing action of a metallic oxid but by employing a metallic compound as catalyst to promote the hydrolysis of chlorin. The catalyst we prefer is copper oxychlorid, but we may also employ other copper compounds such as chlorid or sulfate and we may employ the compounds of nickel and cobalt. As the action is catalytic we can use relatively small amounts and in addition we find there is an important advantage as compared with the salts of mercury, depending on the fact that mercuric chlorid dissolves in ether unlike the chlorids of copper, nickel and cobalt. Hence if the hypochlorous acid is employed for organic syntheses in which ether extractions are concerned, there is no difficulty owing to undesirable substances dissolving in said ether.

Our process therefore consists in passing chlorin into a vessel containing water and a catalyst as above described.

The process is aided by shaking or stirring mechanically so as continuously or occasionally to expose a fresh surface of the liquid to the chlorin, but the chlorin need not be bubbled through.

In this way a solution of approximately 1% hypochlorous acid is readily obtained.

We may connect a cylinder of liquid chlorin with the vessels containing the water and catalyst. If small, these vessels are preferably mounted on a shaker.

In the case of copper oxychlorid we may use about 0.6% of catalyst (calculated on weight of water). The other catalysts need to be used in rather large quantities.

The solution thus formed still containing the dissolved copper finds many applications in practice, or the copper may be removed by precipitation, or the acid solution distilled over from the residue of salts. Such precipitate or residue of salts may be redissolved in water or a solution of hydrochloric acid, and used over again as catalyst in a similar cycle of operations for the preparation of hypochlorous acid, though it is inadvisable to have present any free hydrochloric acid with the regenerated catalyst.

We declare that what we claim is:—

1. Manufacture of hypochlorous acid by the interaction of chlorin with water in presence of a small quantity of a metal halogen compound as catalyst the higher chlorid of which metal is insoluble in ether, so that the liquid may be extracted subsequently with ether without removing any of the catalyst.

2. Manufacture of hypochlorous acid by the interaction of chlorin with water and copper oxychlorid as catalyst the amount of said catalyst being of the order of about 0.6%.

3. Manufacture of hypochlorous acid by the interaction of chlorin with water in the presence of a copper compound containing chlorin as catalyst.

4. Manufacture of hypochlorous acid by the interaction of chlorin with water and copper oxychlorid as catalyst.

In witness whereof, we have hereunto signed our names this 28 day of January, 1916, in the presence of two subscribing witnesses.

WALTER N. HAWORTH.
JAMES COLQUHOUN IRVINE.

Witnesses:
ALLAN BASTER,
GEORGE GUNN.

Copies of this patent may be obtained for five cents each, by addressing the "Commissioner of Patents, Washington, D. C."